United States Patent
Botti

(10) Patent No.: US 7,147,072 B2
(45) Date of Patent: Dec. 12, 2006

(54) METHOD AND APPARATUS FOR PROVIDING HYBRID POWER IN VEHICLE

(75) Inventor: Jean Joseph Botti, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 191 days.

(21) Appl. No.: 10/755,799

(22) Filed: Jan. 12, 2004

(65) Prior Publication Data

US 2004/0211605 A1 Oct. 28, 2004

(51) Int. Cl.
*B60W 20/00* (2006.01)

(52) U.S. Cl. .................. 180/65.3; 180/65.2; 903/943; 903/944

(58) Field of Classification Search ........... 180/65.2, 180/65.3, 65.4, 65.8; 903/908, 944, 943, 903/942; 429/22, 23
See application file for complete search history.

(56) References Cited

U.S. PATENT DOCUMENTS

| | | | | |
|---|---|---|---|---|
| 5,631,532 A | * | 5/1997 | Azuma et al. | 320/102 |
| 5,929,595 A | * | 7/1999 | Lyons et al. | 320/104 |
| 6,116,363 A | * | 9/2000 | Frank | 180/65.2 |
| 6,230,494 B1 | | 5/2001 | Botti et al. | 60/649 |
| 6,484,831 B1 | * | 11/2002 | Gauthier | 180/65.2 |
| 6,495,277 B1 | * | 12/2002 | Edlund et al. | 429/22 |
| 6,609,582 B1 | | 8/2003 | Botti et al. | 180/65.3 |
| 6,656,618 B1 | * | 12/2003 | Iwase | 429/23 |
| 6,672,415 B1 | * | 1/2004 | Tabata | 180/65.2 |
| 6,692,851 B1 | * | 2/2004 | Keskula et al. | 429/13 |
| 6,701,229 B1 | * | 3/2004 | Iwasaki | 701/22 |
| 6,709,362 B1 | * | 3/2004 | Tomohiro et al. | 477/3 |
| 6,847,188 B1 | * | 1/2005 | Keskula et al. | 320/101 |
| 6,868,927 B1 | * | 3/2005 | Boll et al. | 180/65.4 |
| 6,881,509 B1 | * | 4/2005 | Jungreis | 429/23 |
| 2003/0009269 A1 | | 1/2003 | Graf et al. | |
| 2003/0106726 A1 | * | 6/2003 | Yoshii | 180/65.1 |

FOREIGN PATENT DOCUMENTS

EP 1 233 468 A2 8/2002

OTHER PUBLICATIONS

The Revolution Through Evolution Delphi Solid Oxide Fuel Cell for APU and Hydrogen Reformation, Poertrain International, vol. 5, No. 4, 2002, Jean Botti.

* cited by examiner

*Primary Examiner*—Jeff Restifo
(74) *Attorney, Agent, or Firm*—Paul L. Marshall

(57) ABSTRACT

A hybrid powertrain system includes a combustion engine, a battery buffer for storing electric energy by converting it onto chemical energy, which can be converted back into electrical energy when need, a fuel cell unit having multiple fuel cells each of which is an electrochemical energy conversion device that converts hydrogen and oxygen into water, producing electricity and heat in the process, a power level control unit for capturing electrical energy from the fuel cell unit for delivering zero power, full power, or any power level in between, and an electric motor having inputs for receiving energy from the combustion engine, the battery buffer and the fuel cell auxiliary power unit, and an output for generating activation power to a transmission providing a driving force to a vehicle.

4 Claims, 3 Drawing Sheets

| HYBRID POWERTRAIN SYSTEM | VEHICLE SPEED (MPH) | | | |
|---|---|---|---|---|
| | 40 | 50 | 60 | 70 |
| CONVENTIONAL (NO ELECTRICAL LOADS) | 37.6 | 32.9 | 26.3 | 23.6 |
| SOFC PROPULSION (NO ELECTRICAL LOADS) | 50.4 | 41.7 | | |
| SOFC & ICE COMBINED (NO ELECTRICAL LOADS) | | | 29.9 | 27.4 |
| | | | | |
| CONVENTIONAL & 5kw ELECTRICAL LOADS | 27.3 | 25.9 | 23.1 | 20.4 |
| SOFC PROPULSION & 5kw ELECTRICAL LOADS | 34.0 | 31.6 | | |
| SOFC & ICE COMBINED & 5kw ELECTRICAL LOADS | | | 27.6 | 25.6 |

METHOD AND APPARATUS FOR PROVIDING HYBRID POWER IN VEHICLE

BACKGROUND OF THE INVENTION

Electric and hybrid electric vehicles have been available for many years. A hybrid electric vehicle is a vehicle that generally has two sources of energy. One of the sources of energy is electric, and the other source of energy is derived from an internal combustion engine that typically burns diesel or gasoline fuel. A hybrid electric vehicle typically has a greater range than that of an electric vehicle before the batteries need recharging. Moreover, a hybrid electric vehicle is typically equipped with means for charging the batteries through its onboard internal combustion engine.

Generally, a hybrid electric vehicle employs an internal combustion engine and an electric motor to either alternately or in combination provide a driving force for a vehicle. There are several types of electric propulsion systems for hybrid electric vehicles. For example, a pure electric drive system, a series hybrid system, a parallel hybrid system, and a combined series-parallel hybrid system are a few of the designs currently being considered.

Since many of the functions of a hybrid electric vehicle involve an energy storage system (e.g., batteries) and then using this energy at a later time, the performance of the hybrid system is highly dependent on the energy storage system. Some of the factors that are associated with the energy storage system requirements are: power capability, energy capacity, life, cost, volume, mass, temperature, characteristic, etc.

SUMMARY OF THE INVENTION

In an exemplary embodiment, a hybrid powertrain system comprises: an electric motor for providing a mechanical driving force to a vehicle; an engine mechanically coupled to the electric motor for providing mechanical power to drive the electric motor; a fuel cell unit electrically coupled to the electric motor for providing electrical power to power the motor, the fuel cell unit configured in a parallel relationship with respect to the engine; and a battery electrically coupled to the electric motor for providing electrical power to power the motor, the battery configured in a parallel relationship with the engine and the fuel cell.

The hybrid powertrain system further includes power conditioning electronics for conditioning, controlling and/or regulating the electrical power from the fuel cell unit provided to power the motor.

The hybrid powertrain system further includes a clutch disposed between the combustion engine and the motor for selectively providing pure electrical or mechanical propulsion power for a vehicle.

BRIEF DESCRIPTION OF THE DRAWINGS

The hybrid powertrain system will now be described, by way of example only, with reference to the accompanying drawings, which are meant to be exemplary, not limiting, and wherein like elements are numbered alike in several figures.

DETAILED DESCRIPTION OF INVENTION

Figure 1:
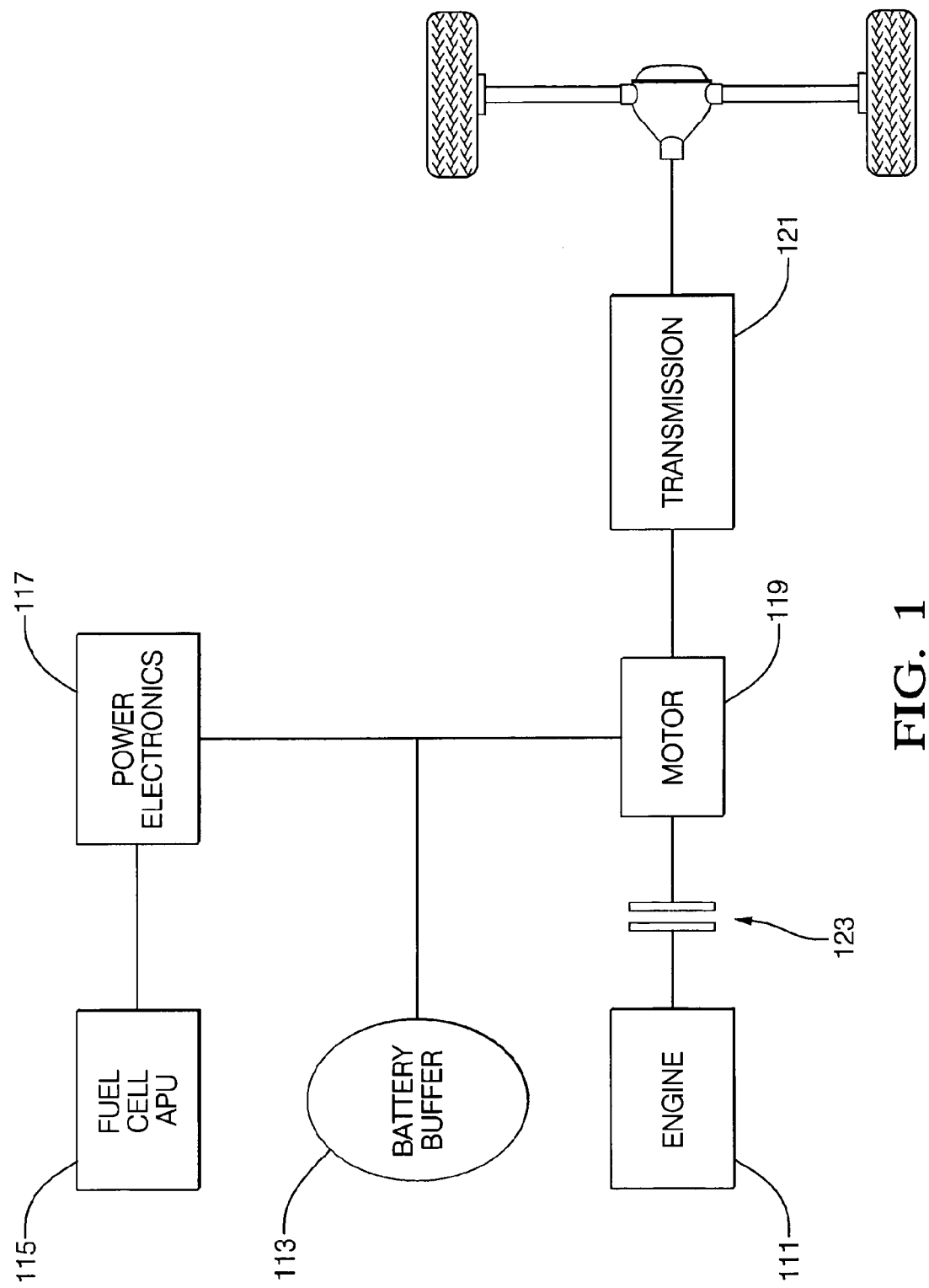
FIG. 1 is a schematic diagram illustrating a hybrid powertrain system according to an embodiment of the present invention.

Referring to FIG. 1, there is provided hybrid powertrain system according to an exemplary embodiment of the present invention, which is employed in a vehicle. Propulsion of the vehicle is powered by one of the energy sources: a combustion engine 111, a battery buffer 113, and a fuel cell unit 115. The combustion engine 111 may be an internal engine using, as its fuel, gasoline, diesel, liquefied petroleum gas (LPG), alcohols, compressed natural gas (CNG), hydrogen and/or other alternative fuels. The combustion engine is coupled to a motor 119 to mechanically drive the motor 119, rather than electrically power the motor 119. The fuel cell auxiliary power unit 115 provides, through a power level control unit 117, electric energy sufficient to power the motor 119. The battery buffer 113 is provided to handle electrical transient responses, but may also be used to start the engine, to power electrical accessories, and other such uses. The battery buffer 113 may also be used to provide electric energy sufficient to power the motor 119.

The fuel cell unit 115 (or fuel cell auxiliary power unit) is comprised of multiple fuel cells, which are often configure in a fuel cell stack, as is well known and is discussed in more detail below. The fuel cells provide the power level control unit 117 (or power conditioning electronics) with a DC (direct current) voltage to power a motor 119 for providing mechanical energy to a transmission 121 of the vehicle. The fuel cells may be any one of the various types of fuel cells such as polymer electrolyte membrane fuel cell, phosphoric acid fuel cell, direct methanol fuel cell, alkaline fuel cell, molten carbonate fuel cell, solid oxide fuel cell, regenerative fuel cell, etc. In the preferred embodiment, the fuel cell auxiliary power unit employs solid oxide fuel cells.

The power conditioning electronics 117 captures electrical energy from the fuel cell auxiliary power unit 115. The power conditioning electronics 117 includes a controller (not shown) for delivering the electrical energy to the motor. The controller is designed to deliver zero power (e.g., when the vehicle is stopped), full power (e.g., when the vehicle is accelerated), or any power level in between.

The battery buffer 113 also provides electric power to the motor 119 to be used as the propulsion power. For example, the battery buffer 113 provides electric power to the motor 119 while the fuel cell auxiliary power unit 115 is warmed up to a selected temperature. The electric power from the battery buffer 113 may also be used to power electrical accessories such as headlights, radios, fans, wipers, air bags, computers and instruments inside the vehicle.

The motor 119 is mechanically coupled to the combustion engine 111 so that mechanical power generated by the combustion engine 111 is delivered through the motor 119. The battery buffer 113 and the fuel cell auxiliary power unit 115 (through the power conditioning electronics 117) are connected to electrical inputs of the motor. The battery buffer 113 preferably provides a buffer of electrical energy such that when operated with the fuel cell auxiliary unit 115 reliable continuous electrical energy is provided to the motor 119. The combustion engine 111, the battery buffer 113, and the fuel cell auxiliary unit 115 are arranged or connected in a parallel relationship with each other with respect to the motor 119. The motor 119 is mechanically coupled to the transmission 121, which provides a driving force to a drive shaft of the vehicle. The motor 119 may be a DC electric motor or an AC electric motor. In case of an AC motor, an AC controller (not shown) is provided to control a three-phase current to the inputs of the motor.

The electric motor 119 in this embodiment may also act as a generator as well as a motor. In other words, the electric motor 119 draws the electric energy from the battery buffer 113 and/or the fuel cell auxiliary power unit 115 (through the power conditioning electronics 117), for example, at the time of accelerating the vehicle. But the electric motor 119 also returns electric energy to the battery buffer 113, for example; when powered by the combustion engine 111, at the time of slowing down, or when braking the vehicle.

A power transfer control unit 123 is provided in the hybrid powertrain system between the combustion engine 111 and the motor 119 for selectively providing pure electric or mechanical propulsion power. In this embodiment, a clutch is employed as a power transfer control unit 123. The clutch 123 when engaged provides for a direct connection of mechanical power to be transferred from the engine 111 through the motor 119 to the transmission 121. When the clutch 123 is not engaged, only electrical power is available, whereby the motor 119 is powered by the electrical power, from the battery buffer 113 or the fuel cell auxiliary power unit 115, which in turn delivers mechanical power through the transmission 121. On the other hand, when the clutch 123 is engaged, the motor 119 is powered by the mechanical power from the combustion engine 111. For example, when the engine 111 is in an active mode (i.e., turned-on mode), the clutch 123 is engaged so that the motor 119 receives the mechanical power from the engine 111. When the engine is in an inactive mode (i.e., turned-off mode), the clutch 123 is not engaged so that the motor 119 receives the electrical power from either the fuel cell auxiliary power unit 115 (through the power conditioning electronics 117) or the battery buffer 113 or from both the fuel cell auxiliary power unit 115 and the battery buffer 113.

Figures 2, 3:
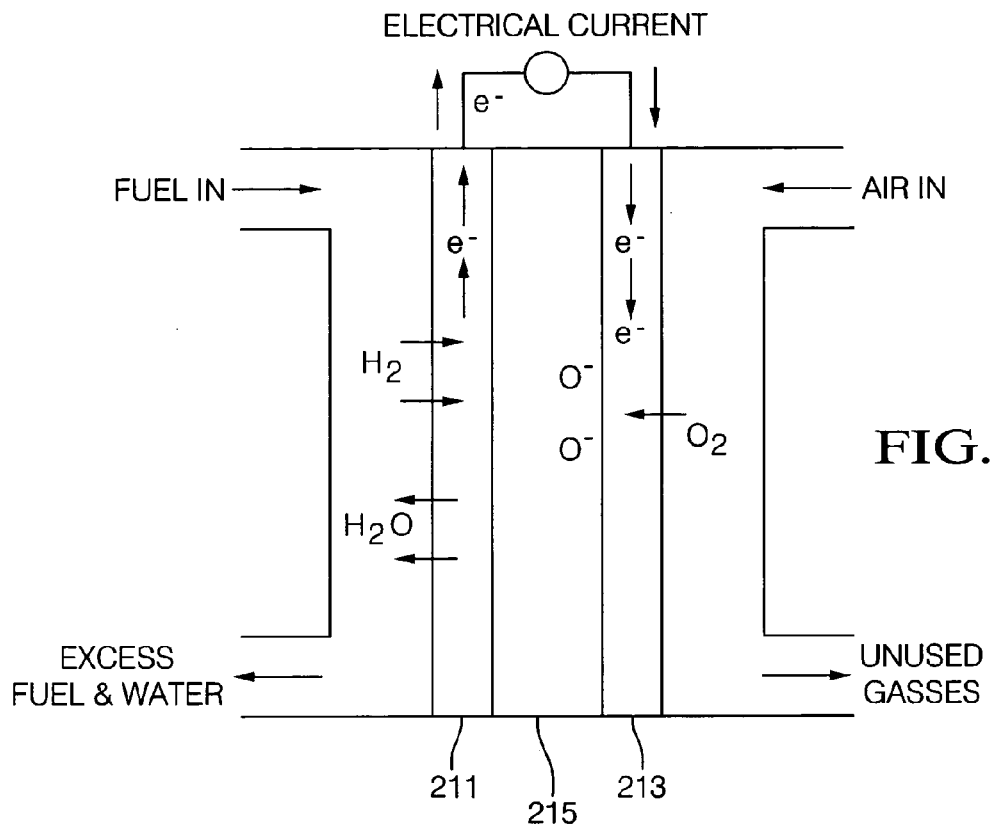
FIG. 2 is a schematic diagram illustrating a solid oxide fuel cell used in the fuel cell auxiliary power unit in FIG. 1.
FIG. 3 is a table showing fuel efficiency of the hybrid powertrain system of the present invention.

Referring to FIG. 2, the fuel cell auxiliary power unit 115 in FIG. 1 has solid oxide fuel cells each of which includes an anode 211, a cathode 213 and an electrolyte 215 sandwiched between the thin electrodes, i.e., the anode 211 and cathode 213. Hydrogen is fed to the anode 211 where a catalyst separates hydrogen's negatively charged electrons from positively charged ions as shown in the following reaction formula:

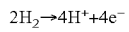

At the cathode 213, oxygen combines with electrons and the negative ions travel through the electrolyte 215 to the anode 211 where they combine with hydrogen to produce water as shown in the following reaction formula:

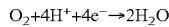

During the above reactions, the electrons from the anode side of the cell cannot pass through the electrolyte 215 to the positively charged cathode 213. The electrons should travel around the electrolyte 215 via an electrical circuit to reach the other side of the cell. This movement of the electrons produces electrical current.

The amount of power produced by a fuel cell depends on several factors, such as fuel cell type, cell size, temperature, pressure at which the gases are supplied to the cell. The fuel cell auxiliary power unit contains multiple fuel cells which are combined in series into a fuel cell stack.

The fuel cells may also be fueled with hydrogen-rich fuels, such as methanol, natural gas, gasoline or gasified coal. In this case, a reformer (not shown) is additionally provided to extract hydrogen from the fuel. In other words, the reformer turns hydrocarbon or alcohol fuels into hydrogen, which is then fed to the fuel cells.

As describe above, the hybrid powertrain system of the present invention is provided with the hybrid power sources such as the combustion engine 111, the battery buffer 113, and the fuel cell auxiliary power unit 115. Since the hybrid powertrain system draws electric energy from either the battery buffer 113 or the fuel cell auxiliary power unit 115, or the combination thereof, it advantageously provides additional fuel efficiency and power electrification for propulsion and accessories of the vehicle.

FIG. 3 is a table showing fuel efficiency of the hybrid powertrain system of the present invention. In the first column of the table, different types of the hybrid powertrain systems are listed. In the first three lines, listed are the hybrid powertrain systems providing power only for propulsion (i.e., no electrical loads). In the next three lines, listed are the hybrid powertrain systems providing power for both the propulsion and electrical loads. The second column shows four different vehicle speeds, 40 MPH, 50 MPH, 60 MPH and 70 MPH. As shown in the table, the power for propulsion and electrical loads is derived from a solid oxide fuel cell unit alone at the lower vehicle speeds (here, 40 and 50 MPH), and derived from the combination of a solid oxide fuel cell unit and an internal combustion engine at the higher vehicle speeds (here, 60 and 70 MPH).

The data in FIG. 3 shows that the hybrid powertrain system provides substantial improvement in fuel efficiency compared with those of the conventional powertrain system. For example, there is 34% improvement in fuel efficiency at vehicle speed 40 MPH when comparing the solid oxide fuel cell powertrain system for propulsion (50.4 MPG) with the conventional powertrain system for propulsion (37.6 MPG). Also, there is 16% improvement in fuel efficiency at vehicle speed 70 MPH when comparing the solid oxide fuel cell and internal combustion engine combined powertrain system (27.4 MPG) with the conventional powertrain system (23.6 MPG).

Figure 4:
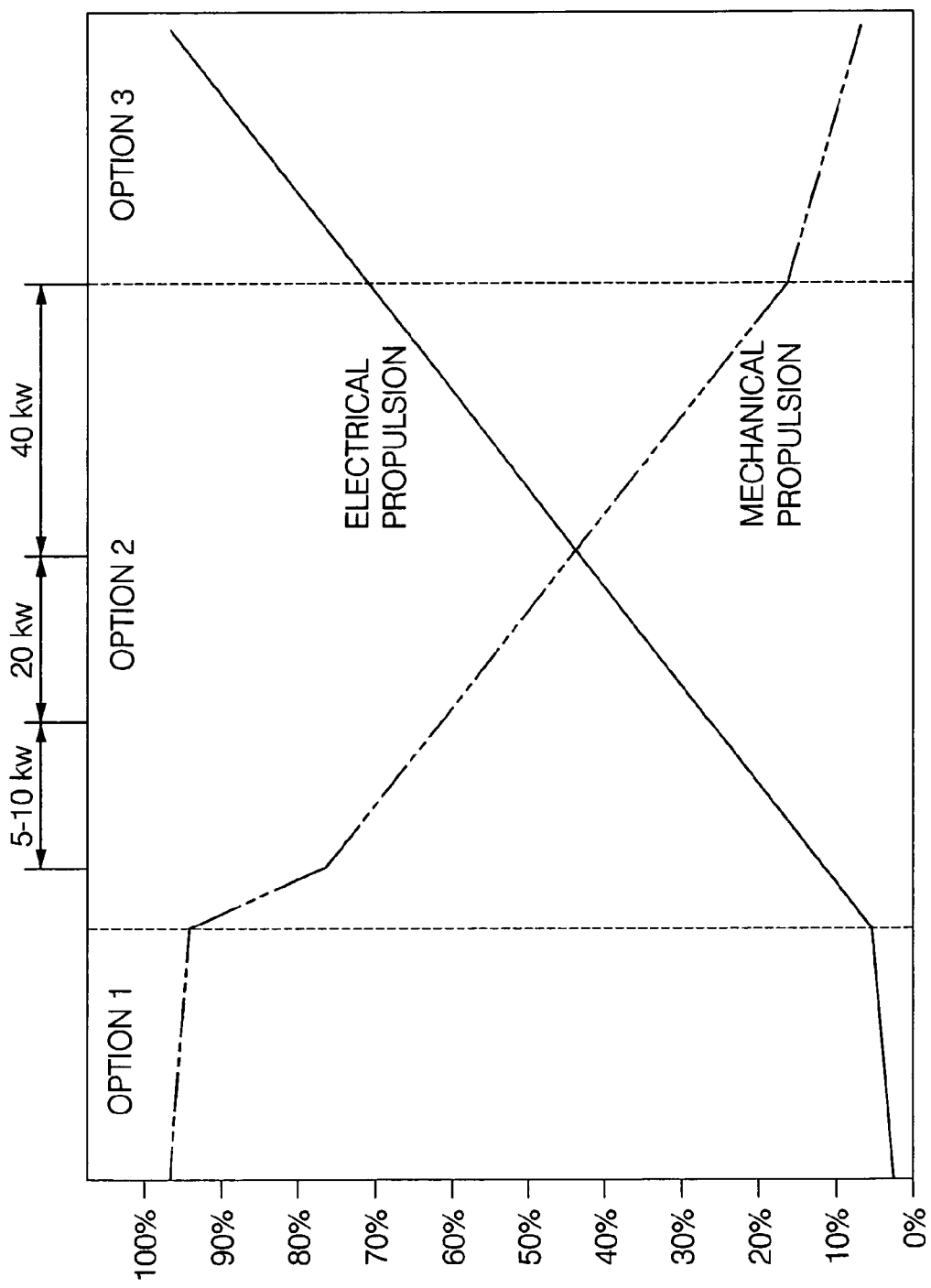
FIG. 4 is a graph showing a propulsion power derived from the fuel cell power unit or the internal combustion engine in different hybrid powertrain systems of the present invention.

FIG. 4 is a graph showing a propulsion power derived from the fuel cell power unit or the internal combustion engine in different hybrid powertrain systems. In the graph, Option 1 represents a mild hybrid powertrain system, for example, a vehicle with a 2.5 liter cylinder gasoline engine, a 5 kw solid oxide fuel cell power unit, and a 42 volt generator for accessories; Option 2 represents a heavy hybrid powertrain system, for example, a vehicle with a 2.5 liter cylinder gasoline engine, a 20 kw ISG (integrated starter generator), a 20 kw solid oxide fuel cell power unit, and a 20 kw lithium battery; and Option 3 represents a "range extender" hybrid powertrain system, for example, a vehicle with a 10 kw solid oxide fuel cell power unit and 100 kg lithium battery.

In the hybrid powertrain system of Option 1, most propulsion power is derived from the gasoline engine as mechanical propulsion, and the fuel cell power unit makes little contribution to the propulsion power. In the hybrid powertrain system of Option 2, the propulsion power derived from the fuel cell power unit (i.e., electrical propulsion) substantially increases, while that derived from the gasoline engine (i.e., mechanical propulsion) decreases. Lastly, in the hybrid powertrain system of Option 3, most propulsion power is derived from the fuel cell power unit, and the gasoline engine makes little contribution to the propulsion power.

While the invention has been described with reference to the preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention may not be limited to the particular embodiment disclosed as the best mode contemplated for carrying out this invention.

What is claimed is:

1. A hybrid powertrain system comprising
   a combustion engine coupled to a motor to mechanically drive the motor;
   a battery buffer for providing power to electrically drive the motor;
   a solid oxide fuel cell unit having a plurality of fuel cells for providing power to electrically drive the motor; and
   a power transfer control unit disposed between the combustion engine and the motor for selectively providing (i) pure electric power directly from the battery buffer to the motor during a fuel cell warm up period wherein the fuel cell is not generating a sufficient amount of power for use in the hybrid Powertrain system and (ii) pure mechanical propulsion directly from the combustion engine to the motor during a fuel cell warm up period wherein the fuel cell is not generating a sufficient amount of power for use in the hybrid Powertrain system, wherein the hybrid powertrain is disposed within a vehicle and the power provided to the motor is solely provided by the solid oxide fuel cell unit when the vehicle is traveling a speed within a range of 40 through 50 mph.

2. The hybrid Powertrain system of claim 1, wherein a fuel efficiency of the hybrid powertrain system is increased at least 25 percent from operating the hybrid powertrain system wherein the power provided to the motor is solely provided by the combustion engine when the vehicle is traveling a speed within a range of 40 through 50 mph.

3. A hybrid powertrain system comprising
   a combustion engine coupled to a motor to mechanically drive the motor;
   a battery buffer for providing power to electrically drive the motor;
   a solid oxide fuel cell unit having a plurality of fuel cells for providing power to electrically drive the motor; and
   a power transfer control unit disposed between the combustion engine and the motor for selectively providing (i) pure electric power directly from the battery buffer to the motor during a fuel cell warm up period wherein the fuel cell is not generating a sufficient amount of power for use in the hybrid Powertrain system and (ii) pure mechanical propulsion directly from the combustion engine to the motor during a fuel cell warm up period wherein the fuel cell is not generating a sufficient amount of power for use in the hybrid Powertrain system, wherein the hybrid powertrain is disposed within a vehicle and the power provided to the motor is provided by the solid oxide fuel cell unit and the combustion engine when the vehicle is traveling a speed within the range of 60 through 70 mph.

4. The hybrid Powertrain system of claim 2, wherein a fuel efficiency of the hybrid powertrain system is increased at least 16 percent from operating the hybrid powertrain system wherein the power provided to the motor is solely provided by the combustion engine when the vehicle is traveling a speed within a range of 60 through 70 mph.

* * * * *